(12) United States Patent
Venkateshaiah et al.

(10) Patent No.: US 11,640,393 B2
(45) Date of Patent: May 2, 2023

(54) UPDATING DATA TEMPLATE CHANGES USING METADATA

(71) Applicant: International Business Machines Corporation, Armonk, NY (US)

(72) Inventors: Hariprasad Venkateshaiah, Bangalore (IN); Gireesh Punathil, Kannur (IN); Tirumalesh Killamsetty, Bangalore (IN); Mayank Gupta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/207,868

(22) Filed: Mar. 22, 2021

(65) Prior Publication Data
US 2022/0300486 A1 Sep. 22, 2022

(51) Int. Cl.
G06F 7/00 (2006.01)
G06F 17/00 (2019.01)
G06F 16/23 (2019.01)

(52) U.S. Cl.
CPC ...... G06F 16/2379 (2019.01); G06F 16/2358 (2019.01)

(58) Field of Classification Search
None
See application file for complete search history.

(56) References Cited

U.S. PATENT DOCUMENTS

| | | |
|---|---|---|
| 7,779,039 B2 | 8/2010 | Weissman |
| 10,503,787 B2 | 12/2019 | Nagaraj |
| 2007/0156699 A1 | 7/2007 | Becker |
| 2008/0162536 A1 | 7/2008 | Becker |
| 2017/0091231 A1* | 3/2017 | DiFranco .............. G06F 16/211 |
| 2019/0102162 A1* | 4/2019 | Pitre .................. H04L 63/0815 |
| 2019/0146830 A1* | 5/2019 | Gerber .................. G06N 20/00 |
| | | 718/101 |

OTHER PUBLICATIONS

Authors et al.: Disclosed Anonymously, "Dynamic content configuration for rapid tenant on-boarding and simplified administration in multi-tenant environment", An IP.com Prior Art Database Technical Disclosure, IP.com No. IPCOM000233767D, IP.com Electronic Publication Date: Dec. 19, 2013, 7 Pages.
Mell et al., "The NIST Definition of Cloud Computing", Recommendations of the National Institute of Standards and Technology, NIST Special Publication 800-145, Sep. 2011, 7 pages.

* cited by examiner

Primary Examiner — Tuan A Pham
(74) Attorney, Agent, or Firm — Edward J. Wixted, III

(57) ABSTRACT

Embodiments herein describe computer-implemented methods, computer program products, and computer systems for updating data templates. In an embodiment, one or more processors may be configured for receiving change data from tenant spaces configured to update tenant data templates of the tenant spaces; generating metadata for each of the tenant spaces corresponding to the change data; determining least common change data based on the metadata; generating change request data for a multi-cloud management platform (MCMP) data template based on the least common change data; and transmitting the change request data to the one or more tenant data templates. The method may further include initializing the MCMP configured to execute a multi-tenant deployment model having the MCMP data template, wherein the MCMP is connected to the tenant spaces.

17 Claims, 9 Drawing Sheets

US 11,640,393 B2

UPDATING DATA TEMPLATE CHANGES USING METADATA

BACKGROUND OF THE INVENTION

The present invention relates generally to the field of cloud database management, and more particularly to updating data templates using metadata in a Multi-Cloud Management Platform (MCMP).

A multicloud environment is quickly becoming the gold standard for many enterprises but managing the assets and data across multiple providers can quickly overwhelm the most experienced data managers. Diverse solutions and infrastructures from various cloud providers may cause incompatibilities, inconsistencies, and other critical issues become more and more apparent without a strategic approach to multicloud management. Solutions have enabled systems to move some workloads to inherently redundant and reliable cloud services in order to combine the stringent controls and sunk cost of on-premises infrastructure with the scale, flexibility, and efficiency of the cloud. Nonetheless, some services were limited, and a need was realized to choose the best services for each particular class of service from various clouds. A multicloud strategy is best serviced by software that enables resource management across several environments, performs accurate assessments for the every-changing service portfolios, and recommends best need-based location and cost and usage predictions.

A MCMP is a digital consumption and delivery platform with integration and orchestration layers that supports multiple technology stacks across a multivendor platform. In a MCMP multi-tenant deployment model, a tenant can behave as a super tenant and as a reseller as well. A content/data template may be provided as part of a service deployed to each tenant from the Out-Of-Box (OOB) platform templates, and tenants are allowed to customize the templates. Data templates copied to tenant specific spaces are represented as updates but are not accessible to other tenants. When tenant specific data templates are updated, similar updates may have been provided by other tenants but are not represented in the OOB data templates. Therefore, updates done by one tenant are not accessible to the other tenants. A solution is needed to provide tenant specific updates across the entire platform.

SUMMARY

Embodiments of the present invention describe computer-implemented methods, computer program products and systems for updating data templates. In an embodiment, the computer-implemented method may include one or more processors configured for receiving change data from one or more tenant spaces configured to update one or more tenant data templates of the one or more tenant spaces; generating metadata for each of the one or more tenant spaces corresponding to the change data; determining least common change data based on the metadata; generating change request data for a multi-cloud management platform (MCMP) data template based on the least common change data; and transmitting the change request data to the one or more tenant data templates.

In an embodiment, the computer-implemented method may include initializing a MCMP configured to execute a multi-tenant deployment model having the MCMP data template, wherein the MCMP is connected to the one or more tenant spaces.

In an embodiment, responsive to generating the change request data, the computer-implemented method may include one or more processors configured for copying the MCMP data template to the one or more tenant data templates, wherein the MCMP data template is only accessible by a first tenant space of the one or more tenant spaces.

In an embodiment, the least common change data is included in the change request data transmitted to the one or more tenant data templates.

In an embodiment, prior to transmitting the change request data to the one or more tenant data templates, the computer-implemented method may include one or more processors configured for removing the least common change data from the metadata.

In an embodiment, the computer-implemented method for determining the least common change data may further include the one or more processors configured for receiving the metadata at a least common change analyzer in the MCMP platform; processing the metadata to identify least common data that is available in the metadata; and generating the least common change data based on the least common data.

In an embodiment, the computer-implemented method for generating the change request may further include the one or more processors configured for receiving the least common change data at a least common change committer; processing, by the least common change committer, the least common change data to identify changes to the one or more data templates that are least common among the one or more tenant spaces; and transmitting, by the least common change committer, the change request data to the MCMP data template.

DETAILED DESCRIPTION

Figure 1:
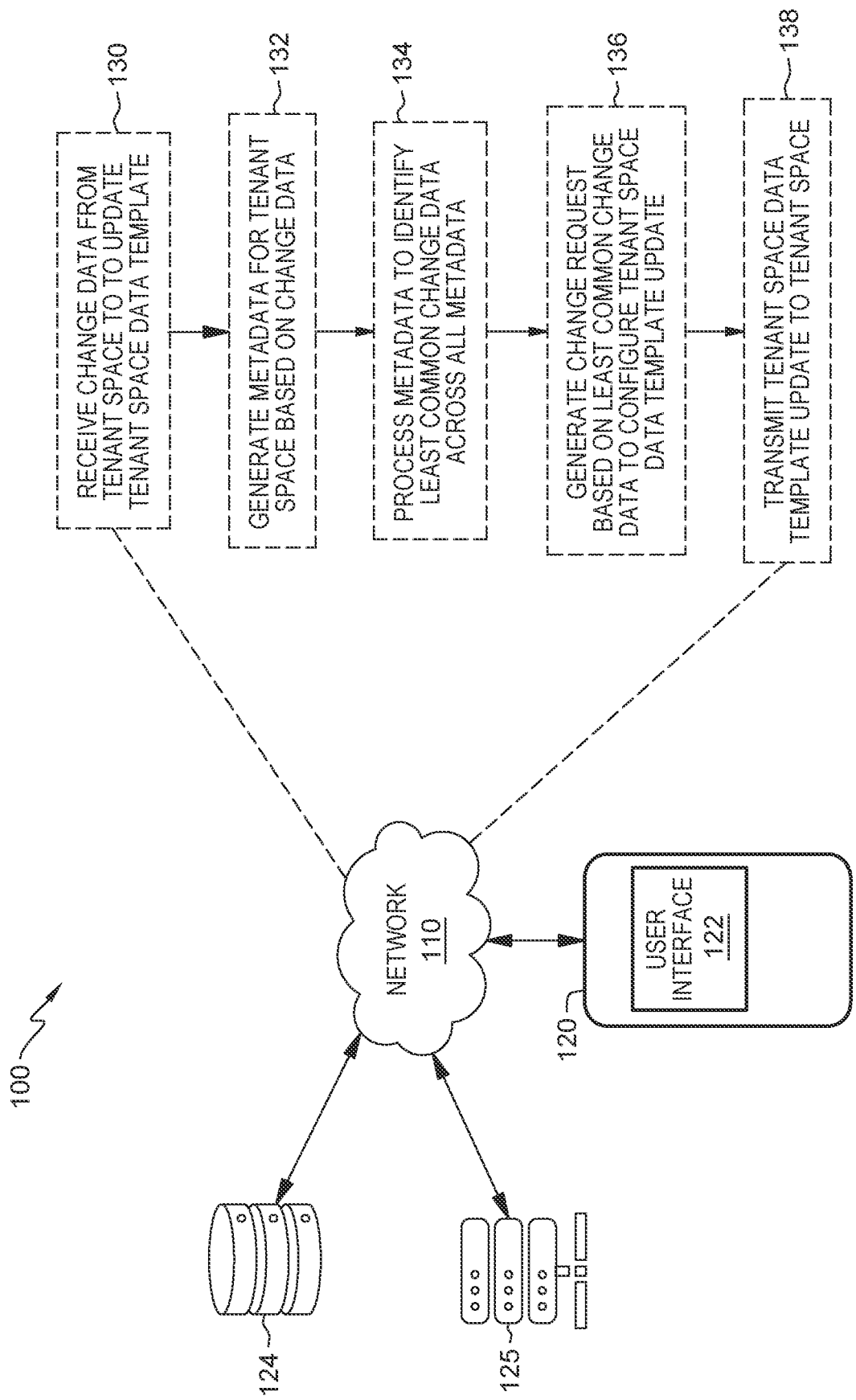
FIG. 1 is a functional block diagram illustrating a distributed data processing environment for updating data templates, in accordance with an embodiment of the present invention.

In a multi-cloud management platform (MCMP) multi-tenant deployment model, a tenant can behave as a super tenant, who is a reseller as well. A MCMP multi-tenant deployment model may provide a content/data template service as one of many service offerings. The content/data service may be deployed to each tenant from the OOB platform templates, and tenants may be allowed to customize their respective data templates. Both regular and super tenants may be allowed to update their respective data templates and data templates may be copied to tenant specific spaces. Updates provided by one tenant may not be accessible to other tenants. When tenant specific data templates are updated, there might be a possibility that similar updates have been made by more than one tenant, and it is better for the MCMP multi-tenant deployment model to include those updates including the corresponding attributes into the OOB data templates. Thus, a solution is needed to make tenant specific updates available to other tenant spaces, especially when one tenant is not able to communicate directly with another tenant. Further, a solution is described herein to retrieve the common updates across the tenants by isolating the data template.

Implementation of embodiments of the invention may take a variety of forms, and exemplary implementation details are discussed subsequently with reference to the Figures.

Embodiments of the present invention describe computer-implemented methods, computer program products and systems for updating data templates. In an embodiment, the computer-implemented method may include one or more processors configured for receiving change data from one or more tenant spaces configured to update one or more tenant data templates of the one or more tenant spaces. Metadata may be generated for each one of the one or more tenant spaces corresponding to the change data. Further, the least common change data may be determined based on the metadata. Change request data for a MCMP data template may be generated based on the least common change data and the change request data may then be transmitted to the tenant data templates.

In an embodiment, the computer-implemented method may include one or more processors configured for initializing a MCMP configured to execute a multi-tenant deployment model having the MCMP data template, wherein the MCMP is connected to the one or more tenant spaces.

In an embodiment, responsive to generating the change request data, the computer-implemented method may include one or more processors configured for copying the MCMP data template to the one or more tenant data templates, wherein the MCMP data template is only accessible by a first tenant space of the one or more tenant spaces. The least common change data may be included in the change request data transmitted to the tenant data templates. Prior to transmitting the change request data to the one or more tenant data templates, the least common change data may be removed from the metadata. The least common change data is removed in this embodiment to prevent duplicative data being stored in the tenant data templates, especially from being stored in the tenant data template from which the least common change data was originally stored.

In an embodiment, the computer-implemented method for determining the least common change data may further include the one or more processors configured for receiving the metadata at a least common change analyzer in the MCMP; processing the metadata to identify least common data that is available in the metadata; and generating the least common change data based on the least common data.

In an embodiment, the computer-implemented method for generating the change request may further include the one or more processors configured for receiving the least common change data at a least common change committer; processing, by the least common change committer, the least common change data to identify changes to the one or more data templates that are least common among the one or more tenant data templates; and transmitting, by the least common change committer, the change request data to the MCMP data template.

FIG. 1 is a functional block diagram illustrating a distributed data processing environment for updating data templates, generally designated 100, in accordance with an embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, distributed data processing environment 100 includes computing device 120, server 125, and database 124, interconnected over network 110. Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between computing device 120, server 125, and database 124. Distributed data processing environment 100 may also include additional servers, computers, or other devices not shown.

Computing device 120 operates to execute at least a part of a computer program for updating data templates. In an embodiment, computing device 120 may be configured to send and/or receive data from one or more of the other computing device(s) via network 110. Computing device 120 may include user interface 122 configured to facilitate interaction between a user and computing device 120. For example, user interface 122 may include a display as a mechanism to display data to a user and may be, for example, a touch screen, light emitting diode (LED) screen, or a liquid crystal display (LCD) screen. User interface 122 may also include a keypad or text entry device configured to receive alphanumeric entries from a user. User interface 122 may also include other peripheral components to further facilitate user interaction or data entry by user associated with computing device 120.

In some embodiments, computing device 120 may be a management server, a web server, or any other electronic device or computing system capable of receiving and sending data. In some embodiments, computing device 120 may be a laptop computer, tablet computer, netbook computer, personal computer (PC), a desktop computer, a smart phone, or any programmable electronic device capable of communicating with database 124, server 125 via network 110. Computing device 120 may include components as described in further detail in FIG. 7.

Computing device 120 may be configured to receive, store, and/or process data received via communication with other computing device(s) connected to network 110. For example, computing device 120 may be communicatively coupled to database 124 and/or server 125 and receive, via a communications link, data corresponding to MCMP systems and associated third-party APIs. Computing device 120 may be configured to store the data in memory or transmit the data to database 124 and/or server 125 via network 110 for further storage and/or processing.

Database 124 operates as a repository for data flowing to and from network 110. Examples of data include change data, metadata, tenant space data, least common change data, change request data, and other data that may be determined based on the previously mentioned data. A database is an organized collection of data. Database 124 can be implemented with any type of storage device capable of storing data and configuration files that can be accessed and utilized by computing device 120 and/or a database server, a hard disk drive, or a flash memory. In an embodiment, database 124 is accessed by computing device 120 to store data corresponding to updating data templates. In another embodiment, database 124 may reside elsewhere within distributed network environment 100 provided database 124 has access to network 110.

Server 125 can be a standalone computing device, a management server, a web server, or any other electronic device or computing system capable of receiving, sending, and processing data and capable of communicating with computing device 120 and/or database 124 via network 110. In other embodiments, server 125 represents a server computing system utilizing multiple computers as a server system, such as a cloud computing environment. In yet other embodiments, server 125 represents a computing system utilizing clustered computers and components (e.g., database server computers, application server computers, etc.) that act as a single pool of seamless resources when accessed within distributed data processing environment 100. Server 125 may include components as described in further detail in FIG. 7.

In an embodiment, environment 100 may include one or more processors configured for receiving 130 change data from one or more tenant spaces configured to update one or more tenant data templates of the one or more tenant spaces. For example, a MCMP may be configured to facilitate data transfer between the MCMP and one or more tenants or super tenants, wherein each tenant or super tenant may modify the data template associated with their respective tenant space. The modifications may be captured as metadata to the one or more data templates and any updates performed will be part of the metadata.

In an embodiment, environment 100 may include one or more processors configured for generating 132 metadata for each one of the one or more tenant spaces corresponding to the change data, wherein the metadata includes respective metadata for each of the tenant data templates.

In an embodiment, environment 100 may include one or more processors configured for determining least common change data based on the metadata. For example, determining least common change data may include the one or more processors configured for processing 134 metadata to identify least common change data across all metadata. The MCMP may include one or more processors configured to pull metadata from the tenant space data templates and process the metadata using a least common change analyzer to identify the least common data that is available across all the metadata.

In an embodiment, environment 100 may include one or more processors configured for generating 136 change request data based on least common change data to configure tenant space data template updates for a MCMP data template. For example, the MCMP may include a least common change committer component configured for generating a change request based at least on the least common change data to configure updates for the tenant space data template. In an embodiment, generating the change request may include one or more processors configured for creating the change request to upload the changes to the MCMP data template for later distribution to the tenant space data templates.

In an embodiment, environment 100 may include one or more processors configured for transmitting 138 tenant data template updates to the tenant spaces. For example, the change request data may be sent to the one or more tenant data templates via the MCMP data template as part of the update process. Tenant space data templates may include one or more configurations for a tenant space and updates to the configurations may be represented as metadata. Configurations may include settings to facilitate self-service capabilities, workflow automation, cloud analysis, etc., which all bring ease and efficiency to the MCMP. In an embodiment, the one or more processors may be configured to push the MCMP data template update to the one or more tenant data templates, wherein the least common change data may be included in the MCMP data template pushed to the tenant data templates in each tenant space.

In an embodiment, environment 100 may include one or more processors configured for initializing a multicloud management platform (MCMP) configured to execute a multi-tenant deployment model having the MCMP data template, wherein the MCMP is connected to the one or more tenant spaces. In an embodiment, prior to transmitting the change request data to the one or more tenant data templates, environment 100 may include one or more processors configured for removing the least common change data from the metadata.

In an embodiment, responsive to generating the change request data, environment 100 may include one or more processors configured for copying the MCMP data template to the one or more tenant data templates, wherein the MCMP data template is only accessible by a first tenant space of the one or more tenant spaces.

In an embodiment, determining the least common change data may further include the one or more processors configured for receiving the metadata at a least common change analyzer in the MCMP; processing the metadata to identify least common data that is available in the metadata; and generating the least common change data based on the least common data.

Figure 2:
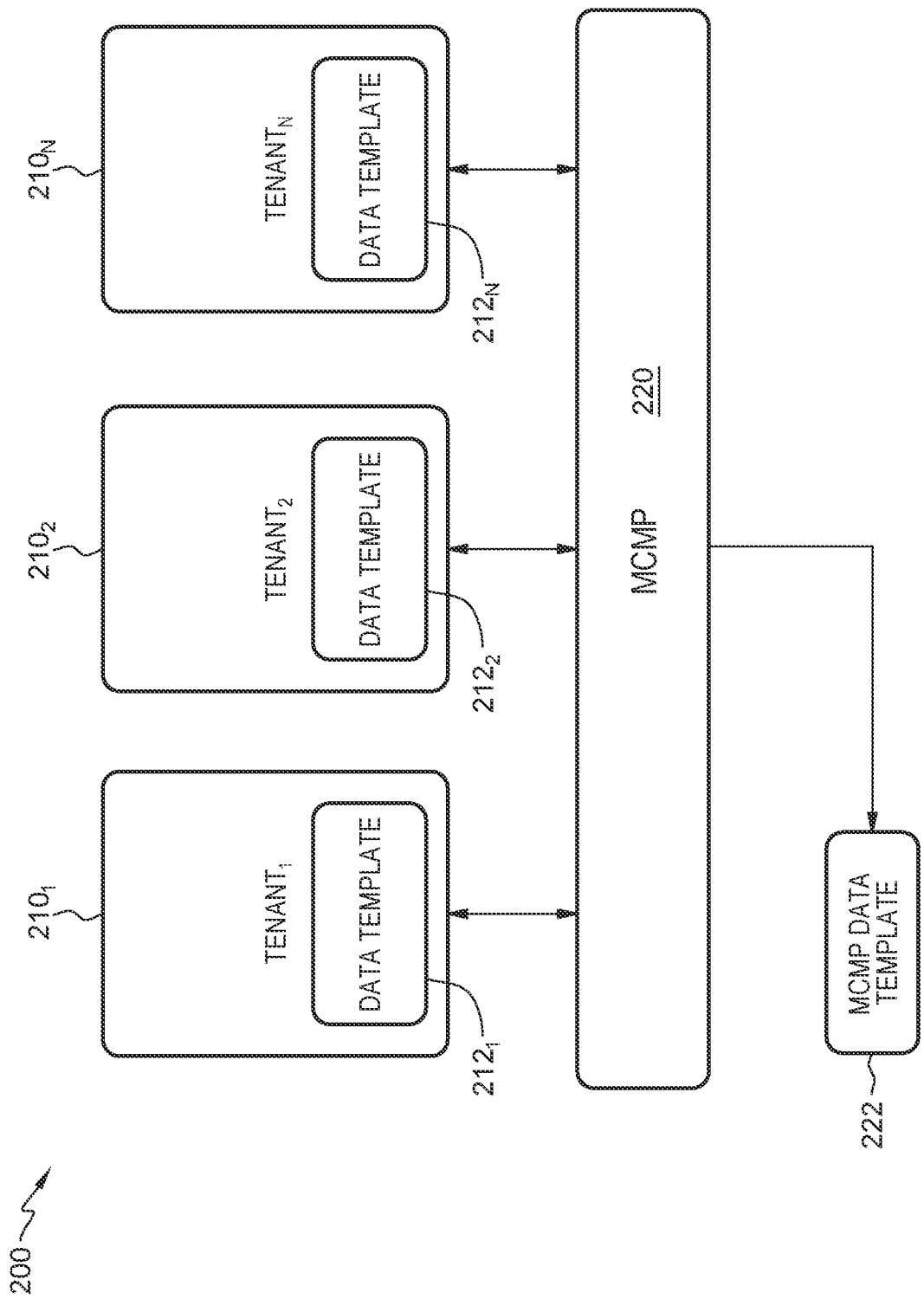
FIG. 2 is a functional block diagram of a system for updating data templates, in accordance with an embodiment of the present invention.

FIG. 2 is a functional block diagram of a system 200 for updating data templates, in accordance with an embodiment of the present invention. In an embodiment, system 200 may include tenant spaces $210_{1-N}$ associated with one or more tenants$_{1-N}$, tenant spaces $210_{1-N}$ each comprising one or more tenant data templates $212_{1-N}$. System 200 may also include MCMP 220 in communication with tenant spaces $210_{1-N}$, wherein MCMP 220 includes integration and orchestration layers that support and facilitate multiple technology stacks across a multivendor platform. System 200 may also include MCMP data template 222 in communication with MCMP 220 and tenant spaces $210_{1-N}$.

Figure 3:
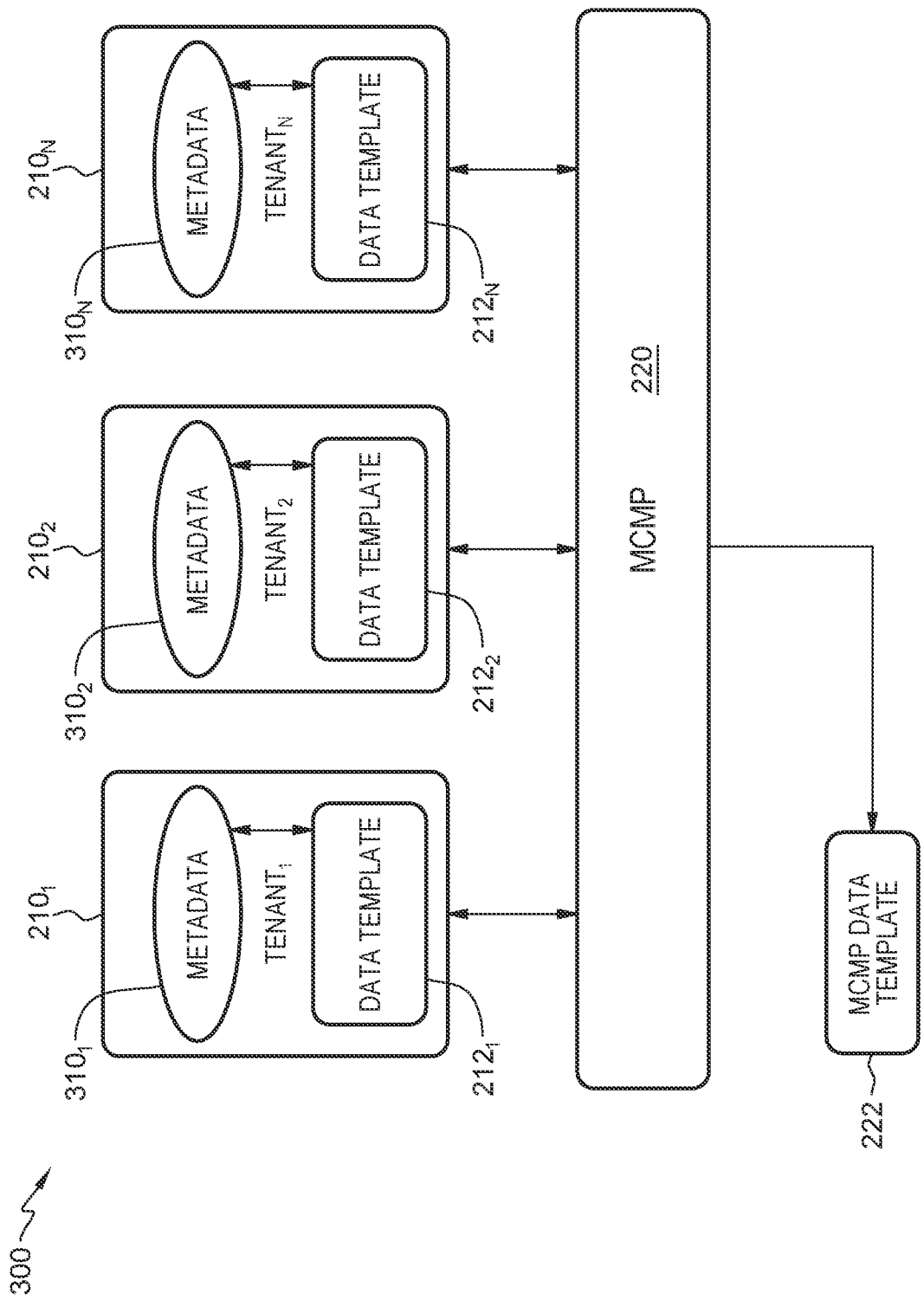
FIG. 3 is a functional block diagram of a system for updating data templates using metadata, in accordance with an embodiment of the present invention.

FIG. 3 is a functional block diagram of a system 300 for updating data templates using metadata, in accordance with an embodiment of the present invention.

In an embodiment, system 300 may include one or more processors configured for generating metadata $310_{1-N}$ for each one of tenant spaces $210_{1-N}$, wherein metadata $310_{1-N}$ is based on change data corresponding to changes made to tenant data templates $212_{1-N}$. For example, tenant space $210_1$ may be configured to receive a change to data template $212_1$ corresponding to an update or some other modification to data template $212_1$. The one or more processors may be configured to generate metadata $310_1$ based on the change, wherein any updates performed will be part of the metadata for the one or more tenant spaces $210_{1-N}$.

Figure 4:
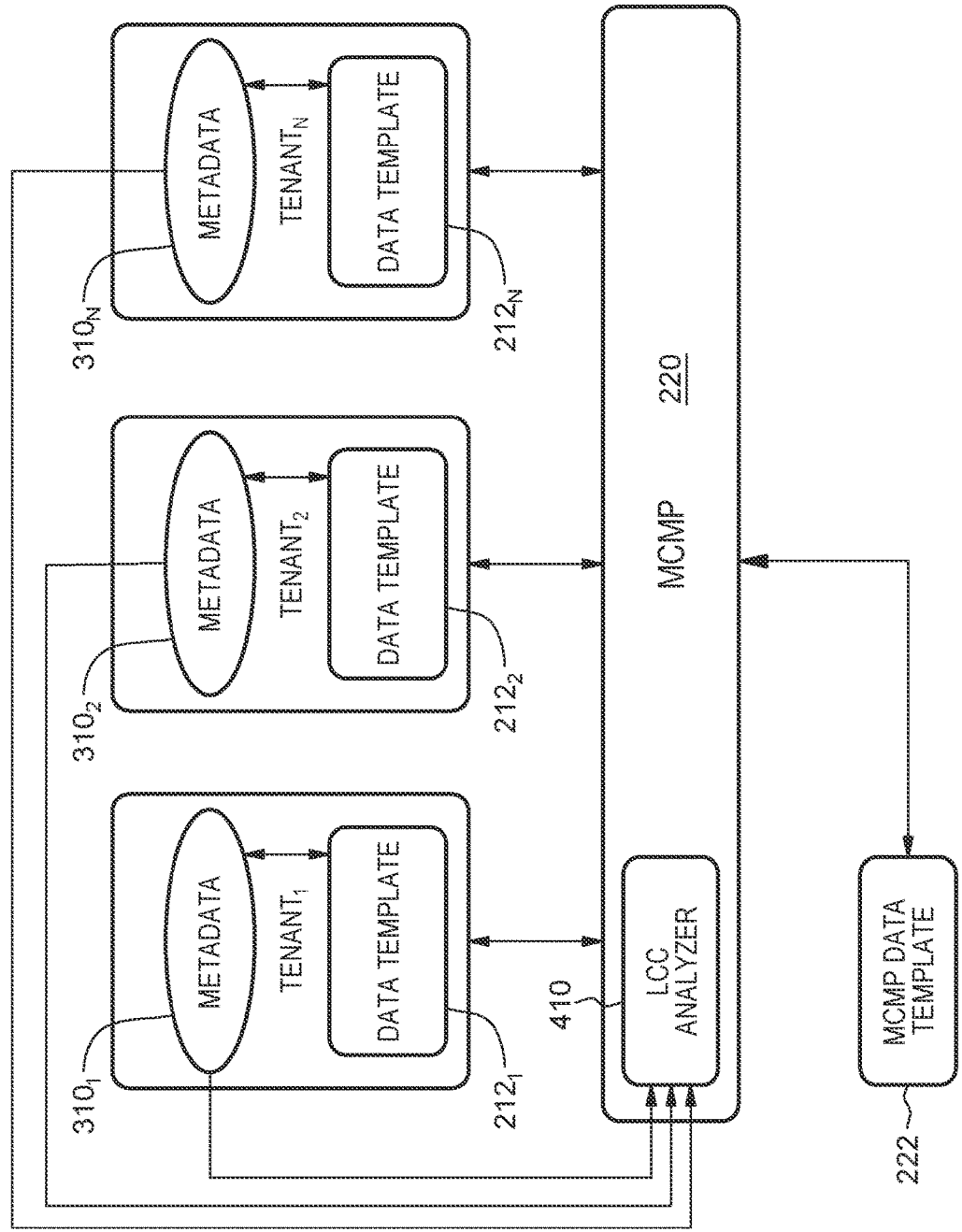
FIG. 4 is a functional block diagram of a system for updating data templates using an LCC analyzer, in accordance with an embodiment of the present invention.

FIG. 4 is a functional block diagram of a system 400 for updating data templates using a least common change ("LCC") analyzer, in accordance with an embodiment of the present invention.

In an embodiment, system 400 may include LCC analyzer 410 configured for determining least common change ("LCC") data based on metadata $310_{1-N}$. For example, MCMP 220 may include LCC analyzer 410 configured to receive metadata $310_{1-N}$ from tenant spaces $210_{1-N}$ and process metadata $310_{1-N}$ to determine the least common change amongst all the changes to tenant data templates $212_{1-N}$ reflected in metadata $310_{1-N}$. The least common change may be determined by sorting each configuration of tenant data templates $212_{1-N}$ and eliminating the unique items present in a first tenant data template configuration that is not present in the other tenant data template configurations. In an embodiment, the least common change may also be determined by sorting each configuration of tenant data templates $212_{1-N}$ and eliminating the common items present in a first tenant data template configuration that are also present in the other tenant data template configurations, leaving behind only the unique changed items across all the tenant data templates $212_{1-N}$.

In an embodiment, LCC analyzer 410 may be configured to sort metadata $310_{1-N}$ to determine the least common change by eliminating the metadata equivalent to the unique items in one configuration that is not present in the other configurations of tenant data templates $212_{1-N}$. For example, among the configurations of each tenant data template $212_{1-N}$, the one or more processors may be configured to organize the configurations in a consistent order to identify which elements of the configurations are common and eliminate the common elements Eliminating the common configuration elements reveals the uncommon configuration elements so that the least common changes are identified. Least common changes in configuration elements may also be determined by other methods known to those of ordinary skill in the art.

Figure 5:
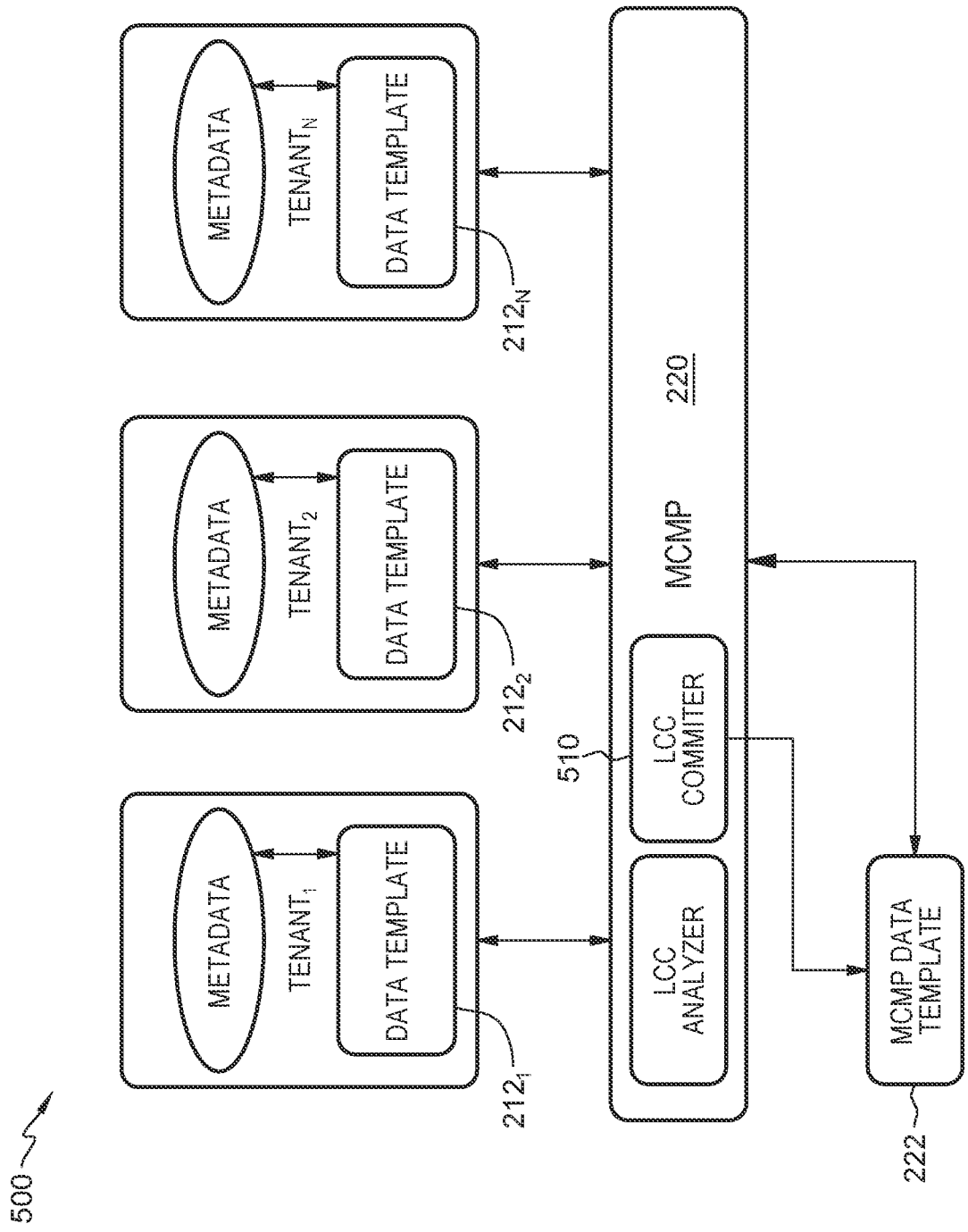
FIG. 5 is a functional block diagram of a system for updating data templates using an LCC committer component, in accordance with an embodiment of the present invention.

FIG. 5 is a functional block diagram of a system 500 for updating data templates using an LCC committer component, in accordance with an embodiment of the present invention. In an embodiment, MCMP 220 may include LCC committer 510 component configured to transmit data corresponding to the least common change to MCMP data template 222. For example, MCMP data template 222 may be in communication with MCMP 220 and configured to receive least common change data from LCC committer 510 to update tenant data templates $212_{1-N}$. In other words, MCMP data template 222 is configured to receive all updates from tenant data templates $212_{1-N}$ and provide those updates as one update to all of tenant data templates $212_{1-N}$. This embodiment allows unique updates from each individual tenant space $210_{1-N}$ to be distributed to all the other tenant spaces $210_{1-N}$ as part of one update so that each tenant space $210_{1-N}$ is adequately up-to-date. However, it is not efficient to update each tenant space $210_{1-N}$ with duplicate or redundant updates through the normal updating process. Therefore, embodiments described herein determines the least common changes to tenant data templates $212_{1-N}$ and makes sure those changes are included in MCMP data template 222 for a later universal update to all tenant data templates $212_{1-N}$. Therefore, data template updates destined for each tenant data template $212_{1-N}$ may be sent from LCC analyzer 410 to LCC committer 510 and then to MCMP data template 222 before being uploaded to the tenant data templates $212_{1-N}$. In an embodiment, MCMP data template 222 may be in communication with MCMP 220 and configured to receive least common change data from LCC analyzer 410 to update data templates $212_{1-N}$.

In an embodiment, if a new tenant space is added to distributed data processing environment 100 after MCMP data template 222 provides the updates to the previously existing tenant spaces $210_{1-N}$, then the one or more processors may be configured to provide the most recent update to the new tenant space so that it will be provisioned with the current configurations present in its peer tenant spaces $210_{1-N}$.

Figure 6:
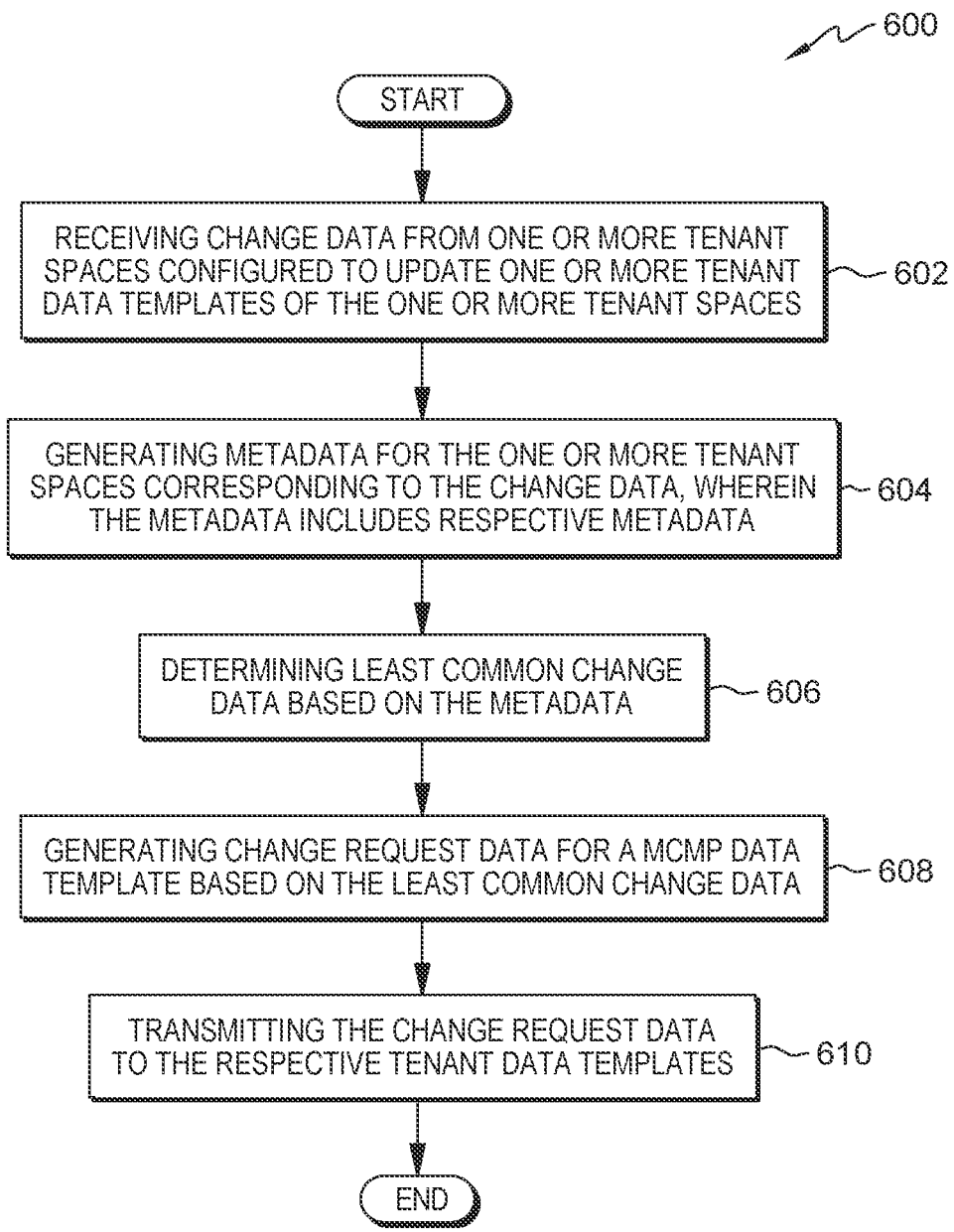
FIG. 6 is a flowchart of a computer-implemented method for updating data templates, in accordance with an embodiment of the present invention.

FIG. 6 is a flowchart of a computer-implemented method for updating data templates, in accordance with an embodiment of the present invention.

In an embodiment, computer-implemented method 600 may include initializing a MCMP platform configured to execute a multi-tenant deployment model having the MCMP data template, wherein the MCMP is connected to the one or more tenant spaces.

In an embodiment, computer-implemented method 600 may include one or more processors configured for receiving 602 change data from one or more tenant spaces executing in a MCMP multi-tenant deployment model configured to update one or more tenant data templates of the one or more tenant spaces. Change data includes data corresponding to any changes, updates, or modifications to one or more of tenant spaces $210_{1-N}$ and tenant data templates $212_{1-N}$.

Computer-implemented method 600 may include one or more processors configured for generating 604 metadata for the one or more tenant spaces corresponding to the change data, wherein the metadata includes respective metadata for at least one of the one or more tenant spaces. For example, metadata $310_1$ includes metadata for data template $212_1$, metadata $310_2$ includes metadata for data template $212_2$, and metadata $310_N$ includes metadata for data template $212_N$.

Computer-implemented method 600 may include one or more processors configured for determining 606 least common change data based on the metadata. In an embodiment, computer-implemented method 600 for determining the least common change data may further include the one or more processors configured for receiving the metadata at a LCC analyzer in the MCMP platform, processing the metadata to identify least common data that is available in the metadata, i.e., data that provides information about tenant data templates $212_{1-N}$ and changes to tenant data templates $212_{1-N}$ within tenant spaces $210_{1-N}$, and generating the least common change data based on the least common data. Least common change data may include data corresponding to a change to a common field within a first tenant data template of tenant data templates $212_{1-N}$, that is not present in the common feature field of the other tenant data templates $212_{1-N}$. For example, if each tenant data template $212_{1-N}$ includes 10 feature fields and 1 of the 10 feature fields is a policy setting, and only the first tenant data template includes a change to the policy setting feature field, then the least common change will be the change to the policy setting feature field. It is important to identify this least common change to the policy setting because the other tenant data templates $212_{1-N}$ may also benefit from receiving this change to their tenant spaces. Thus, the least common change data may be used to update MCMP data template 222 for later distribution to the other tenant data templates connected to MCMP 220.

Computer-implemented method 600 may include one or more processors configured for generating 608 change request data for a MCMP data template based on the least common change data. In an embodiment, responsive to generating the change request data, computer-implemented method 600 may include one or more processors configured for copying a first data template to a first tenant space, wherein the first data template is only accessible by a first tenant. In an embodiment, the least common change data is included in the change request data transmitted to the one or more tenant data templates. Change request data may include data corresponding to receiving user input indicating a request to change, modify or update one or more data fields in the one or more data templates. The change request may also be provided by the one or more processors in response to a condition being satisfied that is independent of user input.

In an embodiment, generating 608 the change request may further include receiving the least common change data at a LCC committer component. Further, the LCC committer component may be configured for processing the least common change data to identify changes to the one or more data templates that are least common among the one or more tenant spaces. Further, the LCC committer component may be configured for transmitting the change request data to the MCMP data template.

Computer-implemented method 600 may include one or more processors configured for transmitting 610 the change request data to each one of the one or more tenant data templates. In an embodiment, prior to transmitting the change request data to the one or more tenant data templates, computer-implemented method 600 may include one or more processors configured for removing the least common change data from the metadata.

Figure 7:
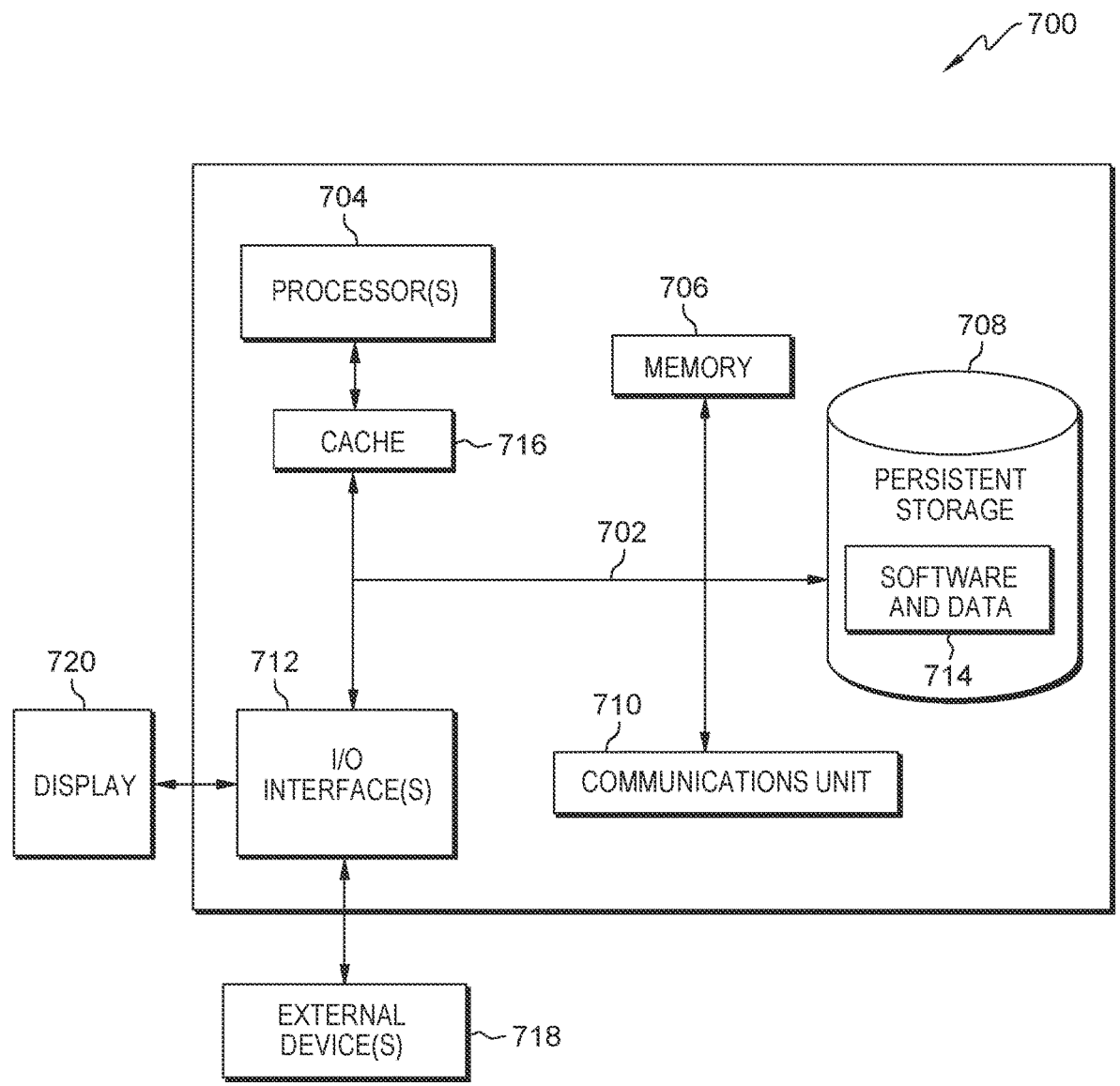
FIG. 7 depicts a block diagram of components of a computing device executing the computer-implemented method for updating data templates within the distributed data processing environment of FIG. 1, in accordance with an embodiment of the present invention.

FIG. 7 depicts a block diagram of components of computing device 700 executing the computer-implemented method 600 for updating data templates within the distributed data processing environment 100 of FIG. 1, in accordance with an embodiment of the present invention. FIG. 7 depicts a block diagram of computing device 700 suitable for server 125 or computing device 120, in accordance with an illustrative embodiment of the present invention. It should be appreciated that FIG. 7 provides only an illustration of one implementation and does not imply any limitations with regard to the environments in which different embodiments can be implemented. Many modifications to the depicted environment can be made.

Computing device 700 includes communications fabric 702, which provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Programs may be stored in persistent storage 708 and in memory 706 for execution and/or access by one or more of the respective computer processors 704 via cache 716. In an embodiment, persistent storage 708 includes a magnetic hard disk drive. Alternatively, or in addition to a magnetic hard disk drive, persistent storage 708 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Programs, as described herein, may be downloaded to persistent storage 708 through communications unit 710.

I/O interface(s) 712 allows for input and output of data with other devices that may be connected to server 125 and/or computing device 120. For example, I/O interface 712 may provide a connection to external devices 718 such as a keyboard, a keypad, a touch screen, and/or some other suitable input device. External devices 718 can also include portable computer readable storage media such as, for example, thumb drives, portable optical or magnetic disks, and memory cards. Software and data 714 used to practice embodiments of the present invention can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

Software and data 714 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure that includes a network of interconnected nodes.

Figure 8:
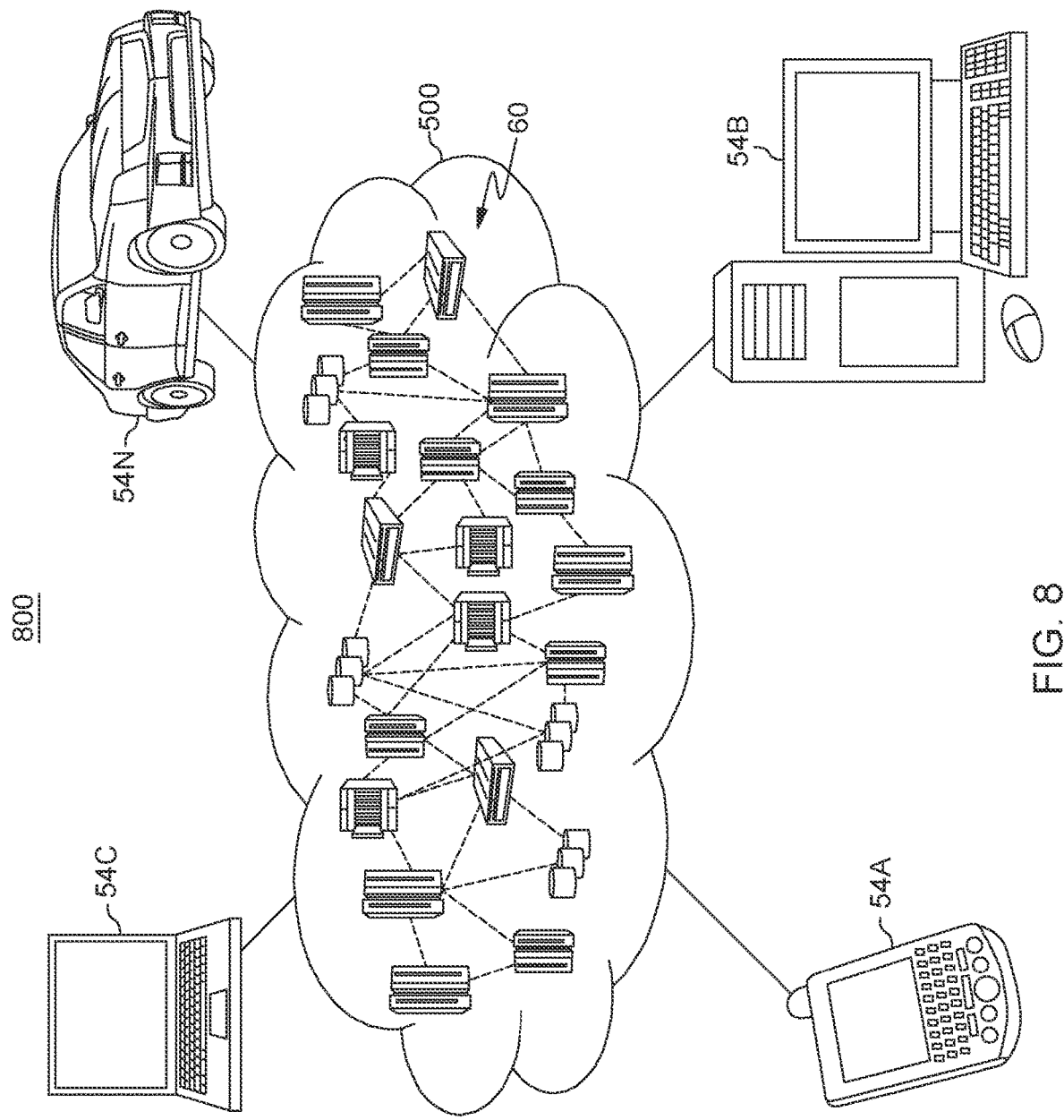
FIG. 8 depicts a cloud computing environment according to an embodiment of the present invention.

FIG. 8 depicts a cloud computing environment 800 according to an embodiment of the present invention. Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
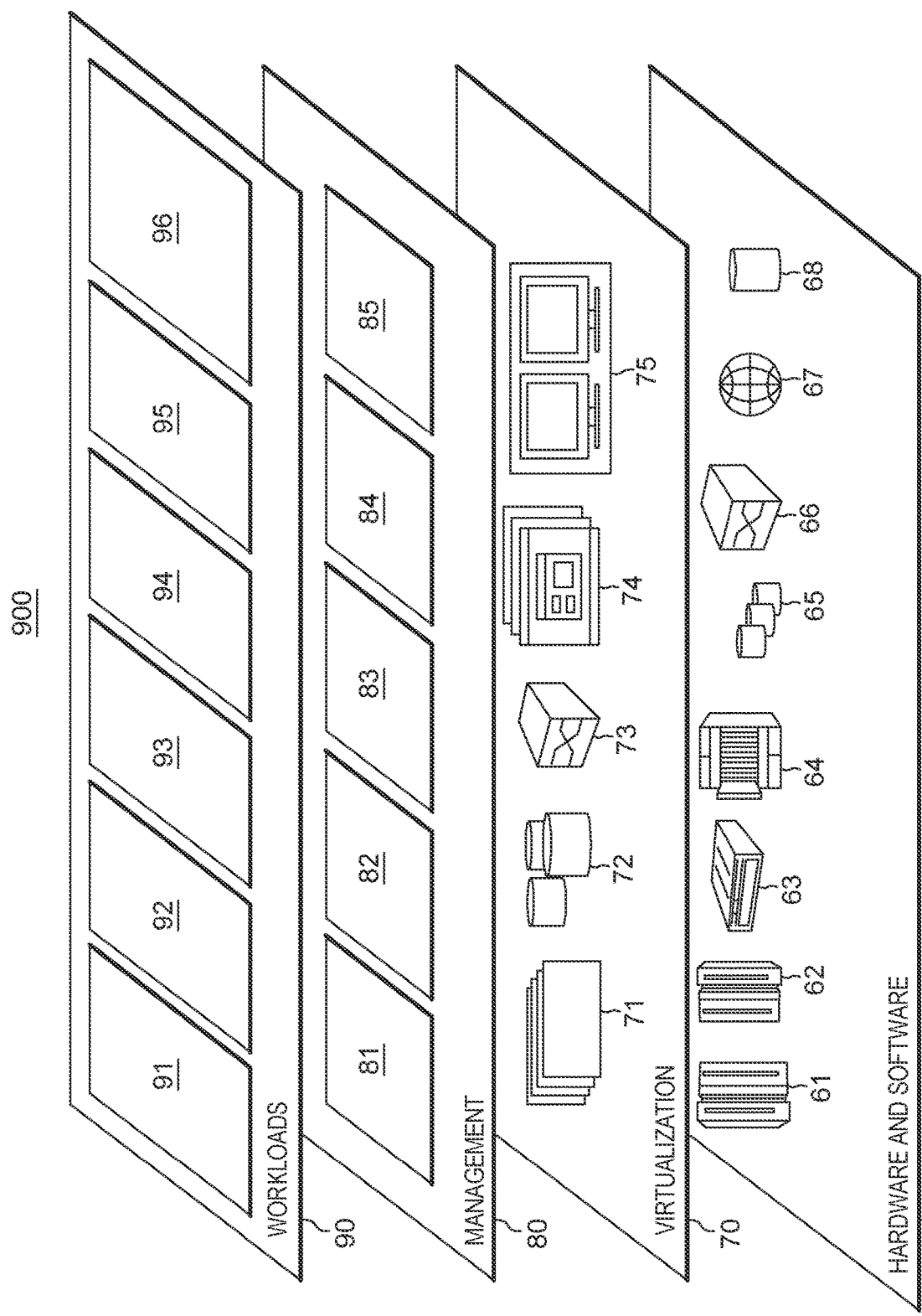
FIG. 9 depicts abstraction model layers according to an embodiment of the present invention.

FIG. 9 depicts abstraction model 900 layers according to an embodiment of the present invention. Referring now to FIG. 9, a set of functional abstraction layers provided by cloud computing environment 800 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and updating data templates using metadata in a MCMP environment 96.

The present invention may be a system, a computer-implemented method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a component, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving, by one or more processors, change data from one or more tenant spaces configured to update one or more tenant data templates of the one or more tenant spaces;
generating, by the one or more processors, metadata for each of the one or more tenant spaces corresponding to the change data;
determining, by the one or more processors, least common change data based on the metadata, wherein determining the least common change data further comprises:
receiving, by the one or more processors, the metadata at a least common change analyzer in a multi-cloud management platform (MCMP); and
processing, by the least common change analyzer, the metadata to identify the least common change data that is available in the metadata, the least common change data comprising at least one unique changed item from a first tenant data template of the one or more tenant spaces that is not present in other tenant data templates of the one or more tenant spaces;
generating, by the one or more processors, change request data for a MCMP data template based on the least common change data; and
transmitting, by the one or more processors, the change request data to the one or more tenant data templates.

2. The computer-implemented method of claim 1, further comprising:
initializing, by the one or more processors, the MCMP configured to execute a multi-tenant deployment model having the MCMP data template, wherein the MCMP is connected to the one or more tenant spaces.

3. The computer-implemented method of claim 1, further comprising:
responsive to generating the change request data, copying, by the one or more processors, the MCMP data template to the one or more tenant data templates, wherein the MCMP data template is only accessible by a first tenant space of the one or more tenant spaces.

4. The computer-implemented method of claim 1, wherein the least common change data is included in the change request data transmitted to the one or more tenant data templates.

5. The computer-implemented method of claim 4, further comprising:
prior to transmitting the change request data to the one or more tenant data templates, removing, by the one or more processors, the least common change data from the metadata.

6. The computer-implemented method of claim 1, wherein generating the change request data further comprises:
receiving, by the one or more processors, the least common change data at a least common change committer;
processing, by the least common change committer, the least common change data to identify changes to the one or more tenant data templates that are least common among the one or more tenant data templates; and
transmitting, by the one or more processors, the change request data to the MCMP data template.

7. A computer program product comprising:
one or more computer readable storage media and program instructions collectively stored on the one or more computer readable storage media, the stored program instructions comprising:
program instructions to receive change data from one or more tenant spaces configured to update one or more tenant data templates of the one or more tenant spaces;
program instructions to generate metadata for each one of the one or more tenant spaces corresponding to the change data;
program instructions to determine least common change data based on the metadata, wherein program instructions to determine the least common change data further comprise:
program instructions to receive the metadata at a least common change analyzer in a multi-cloud management platform (MCMP); and
program instructions to process, by the least common change analyzer, the metadata to identify the least common change data that is available in the metadata, the least common change data comprising at least one unique changed item from a first tenant data template of the one or more tenant spaces that is not present in other tenant data templates of the one or more tenant spaces;
program instructions to generate change request data for a MCMP data template based on the least common change data; and
program instructions to transmit the change request data to the one or more tenant data templates.

8. The computer program product of claim 7, further comprising:
program instructions to initialize the MCMP configured to execute a multi-tenant deployment model having the MCMP data template, wherein the MCMP is connected to the one or more tenant spaces.

9. The computer program product of claim 7, further comprising:
responsive to the program instructions to generate the change request data, program instructions to copy the MCMP data template to the one or more tenant data templates, wherein the MCMP data template is only accessible by a first tenant space of the one or more tenant spaces.

10. The computer program product of claim 7, wherein the least common change data is included in the change request data transmitted to the one or more tenant data templates.

11. The computer program product of claim 10, further comprising:
prior to transmitting the change request data to the one or more tenant data templates, program instructions to remove the least common change data from the metadata.

12. The computer program product of claim 7, wherein the program instructions to generate the change request data further comprises:
program instructions to receive the least common change data at a least common change committer;
program instructions to process, by the least common change committer, the least common change data to identify changes to the one or more data templates that are least common among the one or more tenant data templates; and
program instructions to transmit the change request data to the MCMP data template.

13. A computer system comprising:
one or more computer processors;
one or more computer readable storage media; and
program instructions collectively stored on the one or more computer readable storage media for execution by at least one of the one or more computer processors, the stored program instructions comprising:
program instructions to receive change data from one or more tenant spaces configured to update one or more tenant data templates of the one or more tenant spaces;
program instructions to generate metadata for each one of the one or more tenant spaces corresponding to the change data;
program instructions to determine least common change data based on the metadata, wherein program instructions to determine the least common change data further comprise:
program instructions to receive the metadata at a least common change analyzer in a multi-cloud management platform (MCMP); and
program instructions to process, by the least common change analyzer, the metadata to identify the least common change data that is available in the metadata, the least common change data comprising at least one unique changed item from a first tenant data template of the one or more tenant spaces that is not present in other tenant data templates of the one or more tenant spaces;
program instructions to generate change request data for a MCMP data template based on the least common change data; and
program instructions to transmit the change request data to the one or more tenant data templates.

14. The computer system of claim 13, further comprising:
program instructions to initialize the MCMP configured to execute a multi-tenant deployment model having the MCMP data template, wherein the MCMP is connected to the one or more tenant spaces.

15. The computer system of claim 13, further comprising:
responsive to the program instructions to generate the change request data, program instructions to copy the MCMP data template to the one or more tenant data templates, wherein the MCMP data template is only accessible by a first tenant space of the one or more tenant spaces, wherein the least common change data is included in the change request data transmitted to the one or more tenant data templates.

16. The computer system of claim 15, further comprising:
prior to transmitting the change request data to the one or more tenant data templates, program instructions to remove the least common change data from the metadata.

17. The computer system of claim 13, wherein the program instructions to generate the change request data further comprises:
program instructions to receive the least common change data at a least common change committer component;
program instructions to process, by the least common change committer, the least common change data to identify changes to the one or more data templates that are least common among the one or more tenant data templates; and
program instructions to transmit the change request data to the MCMP data template.

* * * * *